May 17, 1960 R. M. WITUCKI ET AL 2,936,505
METHOD AND APPARATUS FOR FORMING REFRACTORY ARTICLES
Filed Oct. 16, 1958
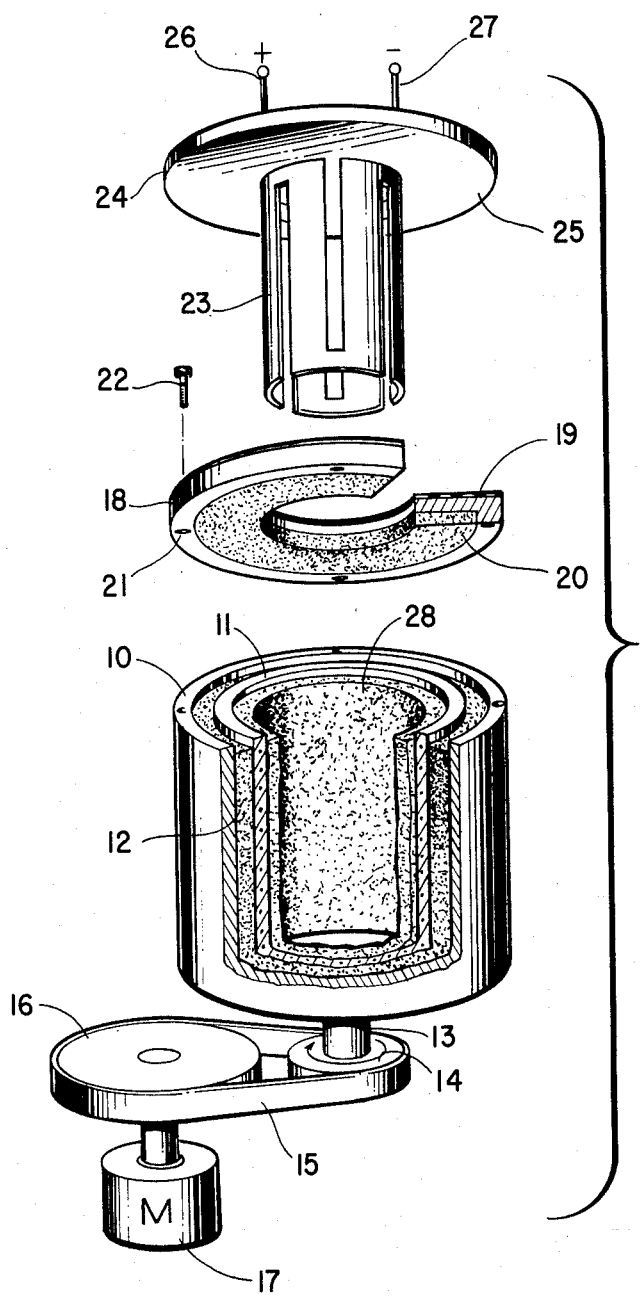
INVENTOR.
ARTHUR E. LEWIS
ROBERT M. WITUCKI
BY
ATTORNEY United States Patent Office 2,936,505
Patented May 17, 1960

2,936,505

METHOD AND APPARATUS FOR FORMING REFRACTORY ARTICLES

Robert M. Witucki and Arthur E. Lewis, Santa Barbara, Calif., assignors to Curtiss-Wright Corporation, a corporation of Delaware Application October 16, 1958, Serial No. 767,613

4 Claims. (Cl. 25—156)

This invention relates generally to the treating of materials and more particularly to a novel method and apparatus for forming refractory type materials in powdered form into desired shapes and maintaining these shapes during sintering.

Forming articles by sintering has heretofore been limited to a considerable extent by the physical properties of the material prior to and during the sintering operation. Refractory materials which do not possess the property of "green strength," that is, strength of the formed material prior to firing, cannot be formed by slip casting or extrusion processes. In addition it is not possible to form these pure materials in other than very small shapes by pressing processes. The principal difficulty in these processes is that after drying a slip casting or removing a presesd part from the die, the formed article does not possess sufficient strength to support its own weight during transfer into a furnace and during firing. To solve this problem various organic binders have been added to these materials during fabrication to provide green strength. These processes still have the difficulty that the binder must be burned out at relatively low temperature. The strength of the bodies is then very low, and warping as firing is continued is a major problem. For large size parts the strength is inadequate to permit forming and firing.

With the foregoing in mind, it is a primary object of the present invention to provide a novel method of holding a powder-like material to be sintered in a desired shape preparatory to and during the sintering process.

More particularly, it is an object to provide a method in which relatively large bodies can be formed by sintering and in which the physical properties and dimensions of such bodies can be accurately controlled.

Another object is to provide a method which will enable bodies of combinations of materials to be sintered to the end that the physical properties of the final product such as the coefficient of thermal expansion, the modulus of elasticity, and the like can be controlled.

Still another important object is to provide a novel method and apparatus for aiding and accelerating the sintering of materials.

Another object of this invention is to provide an apparatus for carrying out the foregoing methods.

In accordance with the method of the invention, centrifugal forces are employed to support a powder to be sintered. Basically, the steps of the method comprise the positioning of the material in powdered form within a mold having sidewalls which may be shaped to define the exterior shape of the finally desired product. The mold is rotated so that the powdered material is supported against the sidewalls by centrifugal force. The inner surfaces may then be machined to a desired contour. Heat is then supplied while the material is being rotated for a period of time sufficient to effect at least a preliminary sintering of the material after which it may be removed from the mold.

Further steps of the method may include additional machining of the partially sintered body to produce the finally desired shape. The sintering operation may then be completed in the original mold or in a suitable furnace.

A preferred apparatus for carrying out the foregoing method comprises a cylindrically shaped outer housing, an inner cylindrical mold coaxially positioned within the outer housing, and insulation material such as powdered carbon disposed in the annular space between the walls of the housing and mold. A suitable drive means rotates the complete housing and mold. A slurry of the powdered material or simply the dry powdered material itself may be poured into the mold against the inside walls thereof and this material will be held to the walls by centrifugal force. While the mold is thus rotated and after the material is dried in the event a slurry is used, a heating means preferably in the form of an electrically heated thermal element is lowered into the mold to effect the sintering.

A better understanding of the invention will be had by referring to the accompanying drawing showing an exploded perspective view of one type of apparatus for carrying out the method.

Referring to the drawing there is shown a furnace housing comprising an outer cylinder 10 which may be made of steel. Coaxially positioned within the cylinder 10 is an inner cylindrical mold 11 of graphite. The exterior wall of the mold 11 and the interior wall of the cylinder 10 define an annular space which is filled with insulation material 12, such as powdered carbon.

The entire furnace housing is mounted on a shaft 13 connected to a pulley 14. Pulley 14 is driven by driving belt 15 from pulley 16 in turn rotated by motor 17. The desired speed of rotation can be controlled by changing the motor speed or the relative diameters of the pulleys 14 and 16.

An apertured bearing plate 18 is arranged to seat on top of the outer wall 10 and inner wall 11. As shown, this plate includes an upper bearing surface 19 of graphite and a lower annular insert of porous carbon 20 to provide thermal insulation. Suitable bolt openings such as indicated at 21 are provided for bolts 22 to secure the plate 18 to the top of the outer cylinder 10. The plate 18 rotates with the housing.

In order to provide heat for sintering material in the mold 11, there is provided a graphite heating element 23 suspended from a circular cover plate 24 having an underside surface 25 arranged to bear against the graphite bearing surface 19 of the plate 18. Suitable terminals 26 and 27 are provided for passing current through the heating element 23.

In operation, the plate 18 is secured to the cylinder 10 and the entire housing is rotated. Material, either in powdered form or in the form of a slurry including powder and a liquid, is then poured through the central opening of the plate 18 against the inner wall 11 as indicated at 28. The centrifugal force as a consequence of the rotation of the mold 11 will hold the material against the inner wall. Although the degree of compaction or density of the material is determined to a large extent by the temperature and pH of the slurry, the compaction while forming may also be controlled to some extent by the centrifugal forces established.

Although either simple powder or a slurry can be poured into the mold, it is preferable to use a slurry in order to attain maximum compaction and uniformity of distribution about the inside of the wall of the mold 11 while the housing is being rotated.

Prior to the insertion of the heating element 23, the rotation is continued a sufficient length of time to remove the liquid portion of the slurry and dry the powdered material. The thermal element 23 is then lowered into the rotating mold through the central opening of the plate 18, the underside bearing surface 25 engaging the top graphite bearing surface 19 of the plate. The terminals 26 and 27 and cover 24 as well as the thermal heating element 23 all remain stationary during the sintering process.

Heat may be applied until the material 28 is partially sintered to a condition in which it can support its own weight and can be machined. The material 28 may then be removed and so machined to a desired shape and then placed in a furnace suitable for final sintering. Alternatively, sintering may be continued in the rotating mold until the final desired fired density is achieved. In certain instances depending on the material used, heating may be continued until the material melts. After melting, the heating is discontinued and the material cooled while still rotating the mold and then removed.

The use of centrifugal force for holding the shape of the material to be sintered presents many advantages. For example, monophase or polyphase materials may be readily manufactured by simply adding a mixture of powdered materials having different physical properties in place of the powdered material 28 initially poured within the mold, or by adding different powdered materials in succession into the mold. In various applications within the scope of this invention, the mixed powders can have different melting temperatures so that a lower melting material can melt and flow between the grains of the first material, or the different materials can have different physical properties such that the combination of these materials results in a new material having properties different from any of the starting materials. In general, many desired physical properties of the resulting product can be effected by simply varying the materials added.

As another consequence of the employment of centrifugal force, after the powdered material is initially distributed about the mold, a second material of a much higher melting point can be distributed inside the first material. The second material in this case serves the function of greatly increasing the compressive forces on the material to be sintered. By employing a second material of sufficiently high melting point, it, itself will not sinter as a consequence of the application of heat.

While the method and apparatus is best suited to the formation of relatively large pipes and cylinders, various other shapes can be formed by varying the geometry of the inner wall 11 of the mold. Thus almost any desired exterior shape may be provided to the finished product. The interior of the product as mentioned heretofore may be shaped prior to any sintering while in the rotating mold or may be machined after partial or complete sintering in accordance with desired specifications.

From the foregoing, it will be evident that the present invention has provided a novel method and apparatus for producing large bodies formed by sintering which have been difficult or impossible to produce heretofore. While only preferred embodiments of the method and apparatus have been described, modifications that fall within the scope and spirit of this invention will readily occur to those skilled in the art. The method and apparatus are, therefore, not to be thought of as limited to the particular steps and structures set forth for merely illustrative purposes.

What is claimed is:

1. A method of forming and sintering a powdered material into a shape comprising the steps of: preparing a slurry of said material in powdered form with a suspending liquid; rotating a mold having sidewalls defining the exterior configuration of said shape about a central axis; pouring said slurry into said mold while said mold is rotating so that said material in powdered form is held against said sidewalls by centrifugal force; maintaining said rotation until said material in powdered form is dry; introducing heating means into the central portion of said mold to heat said material to a sufficiently high temperature while said mold is rotating to at least partially sinter the same and solidify said material to an extent that it can support itself after removal from said mold; and machining the interior of said material after removal from said mold to provide said shape.

2. The method of claim 1, including the step of adding a second material to said mold prior to sintering said first material, said second material having different physical properties from said first material to provide a composite material after sintering having specified physical properties.

3. The method of claim 1, including the step of adding an additional material whereby increased compressive forces as a consequence of said centrifugal force are applied to said powdered material during sintering thereof.

4. An apparatus for forming a material in powdered form into a desired shape and for sintering said material while in said shape, comprising, in combination: a mold structure having an open end and inside sidewalls of a configuration defining the exterior of said desired shape; an outer cylindrical wall of inside diameter greater than the outside diameter of said mold surrounding said mold; heat insulating material disposed within the annular space between the interior surface of said outer cylindrical wall and the exterior surface of said mold; means for mounting said mold and outer wall for rotation about an axis centrally disposed with respect to said sidewalls so that said sidewalls surround said axis; a bearing plate having a central opening; means for securing said bearing plate to said open end of said mold; heating means including a stationary heating element; a cover plate secured to the upper end of said heating element and adapted to be positioned in bearing engagement with said bearing plate to introduce said heating element through said central opening into said mold; and drive means connected to rotate said mold about said axis whereby said material can first be treated by rotation of said mold without said heating element and said heating element subsequently introduced to sinter said material without interrupting rotation of said mold.

References Cited in the file of this patent
UNITED STATES PATENTS

| | | |
|---|---|---|
| 1,096,688 | Dantsizen | May 12, 1914 |
| 1,680,832 | Wilder | Aug. 14, 1928 |
| 2,104,557 | George et al. | Jan. 4, 1938 |
| 2,390,354 | Clapp | Dec. 4, 1945 |
| 2,557,971 | Jacklin | June 26, 1951 |
| 2,805,456 | Bosna | Sept. 10, 1957 |